Jan. 20, 1942. W. R. BREWSTER 2,270,499
MOTOR VEHICLE ATTACHMENT
Filed Oct. 1, 1938

INVENTOR
William R. Brewster
by
ATTORNEY

Patented Jan. 20, 1942

2,270,499

UNITED STATES PATENT OFFICE 2,270,499

MOTOR VEHICLE ATTACHMENT

William R. Brewster, Albany, N. Y.

Application October 1, 1938, Serial No. 232,841

1 Claim. (Cl. 152—415)

In modern motor vehicle designs, compartments are formed in the rear of the vehicles for carrying luggage and like articles and in such compartments the spare tire is usually kept. These compartments are provided with hinged doors which may be closed and locked. Ordinarily, motorists keep their baggage compartments locked at all times both to prevent theft of the spare tire and also safely to permit them to keep tools and other articles therein. It frequently happens, therefore, that the spare tire is not periodically supplied with air to maintain the desired pressure therein and its deficiency in air is many times discovered only when the spare tire is needed. Failure to maintain air pressure in spare tires which are locked in baggage compartments is mostly attributable to the fact that people either forget the spare tire either because it is out of sight or else because they do not care to unlock the storage compartment.

My invention particularly relates to means for supplying air to a spare tire in a luggage compartment of a motor vehicle so that air may be supplied thereto without the necessity of opening the cover of said compartment.

A first object of my invention resides in the provision of means comprising a tubular element adapted to permit the passage of air therethrough, one end thereof being disposed in an accessible location outside of the spare tire compartment of a motor vehicle and the other end thereof being disposed within said compartment and adapted to be attached in communication with the valve stem of a spare tire in said compartment. Another object lies in the provision of an air supply means of the foregoing character including pressure-responsive means for opening the valve in the valve stem of the tire when air under pressure is supplied thereto.

With these and other objects in view, my invention includes the novel elements and the combinations and arrangements thereof described below and illustrated in the accompanying drawing in which—

Figure 1:
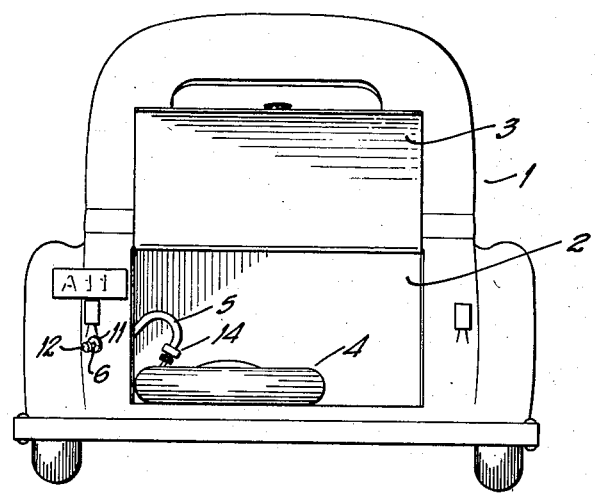
Fig. 1 is a rear view of a motor vehicle illustrating the cover of the spare tire compartment in raised position more clearly to show the association of my invention with said motor vehicle body.

Referring to the drawing, 1 indicates generally a motor vehicle body having a spare tire and baggage compartment 2 therein provided with the usual hinged cover 3 adapted to be locked in compartment-closing position. Ordinarily, a spare tire and wheel for the motor vehicle is carried within the compartment 2 and, as illustrated, a spare tire 4 and wheel is shown lying upon the bottom of the compartment.

Figure 2:
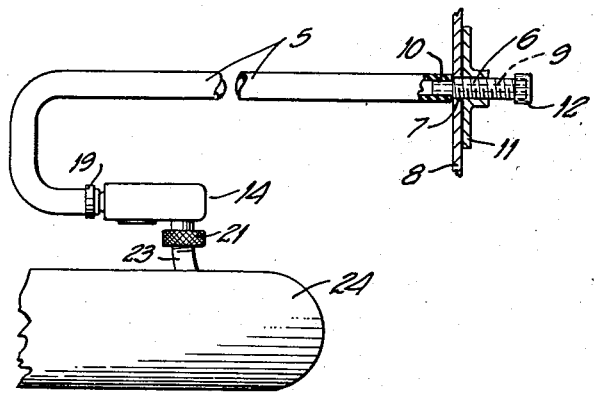
Fig. 2 is a fragmentary, somewhat schematic view of my invention.

In the embodiment illustrated, the means which I have provided for supplying air to the spare tire 4 comprises a tubular element 5 which may be formed of flexible material such as rubber or which may be substantially rigid, in which event, at least that portion of the tubular element substantially at or adjacent the end thereof which is designed for attachment to the valve stem of the spare tire is preferably somewhat flexible to afford easy attachment and detachment of the tubular air supply element to the spare tire. As illustrated in Fig. 2, one end of the tubular element 5 is secured upon an exteriorly threaded nipple 6 which is positioned to extend through an opening 7 in the side of the motor vehicle body indicated at 8 which may form one wall of the compartment 2. The nipple 6 is provided with a passage 9 which, when the tubular element 5 is secured over the reduced portion 10 of the nipple, communicates with the interior of the tube 5. Preferably, tube 5 abuts the shoulder formed between the restricted portion 10 and the main body of the nipple 6 and extends therebeyond so as to cooperate with the flanged nut 11, threaded upon the nipple 6, firmly and rigidly to hold the nipple in position with one end thereof extending exteriorly of the body. Tube 5 may be cemented upon the nipple 6 or secured thereto by any suitable means. A cap 12, similar to the caps usually employed in closing the ends of valve stems, of course, may be threaded upon nipple 6 to close the end thereof.

Figure 3:
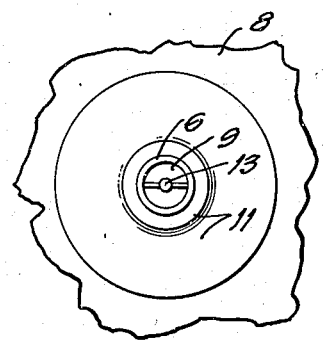
Fig. 3 is a fragmentary elevation view, somewhat enlarged, of a detail.
Figure 4:
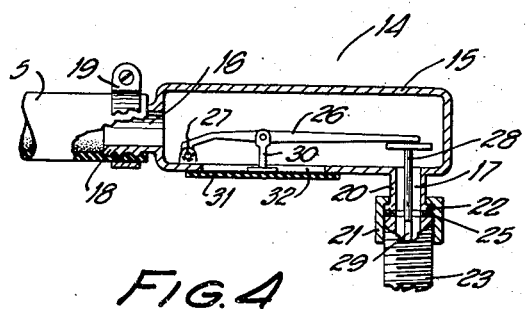
Fig. 4 is a fragmentary, sectional view of the pressure-responsive element of my invention.

As illustrated in Fig. 3, the end of nipple 6 is preferably provided interiorly thereof with a stop or lug 13 which is designed, when the valve on the end of an air supply hose is pressed over the end of nipple 6, to open said valve and release air under pressure therefrom. Hence, while an air supply hose is pressed over the nipple 6, air flows therefrom and into the tubular element 5 which is adapted to conduct it to the spare tire. In practice, it is desirable to provide means for opening the valve in the valve stem of the spare tire when and only when air is supplied thereto through the tube 5. For this purpose, a pressure-responsive device, indicated generally at 14, is illustrated secured to that end of the tubular element 5 which is located within the spare tire compartment.

The pressure-responsive device 14 comprises a hollow body 15 provided with an inlet 16 and an outlet 17. Inlet passage 16 is formed within a boss 18 which preferably is provided with corrugations or ribs on the exterior thereof affording gripping means over which the end of the tubular element 5 may be passed, assuming that tube 5 is formed of rubber or other flexible compressible material, and a clamp 19 may be provided to effect an air-tight joint between the tube 5 and the casing 15. The outlet 17 is formed within a flanged, cylindrical projection 20, a knurled nut 21 being provided with a flange disposed to overlie and engage the flange 22 of the cylindrical projection 20 in the usual manner whereby the interiorly threaded nut 21 may be screwed upon the valve stem 23 of a spare tire 24 and maintain the interior of the pressure-responsive device 14 in communication with the passage in the valve stem 23. A suitable gasket 25 may be disposed beneath the flanged end of projection 20 to effect an air-tight joint when it is compressed between said projection and the end of valve stem 23. Within the casing 15 is mounted a lever 26 pivotally mounted at one end as at 27 and with the other end thereof resting upon the head of a plunger 28 which plunger is loosely fitted within the outlet passage 17.

In the drawings, the relative diameters of the plunger 28 and passage 17 have been exaggerated in order to show that air may normally flow through said passage and about the plunger 28. The head of plunger 28 will keep the plunger within the passage 17 at all times by either engaging the lever 26 or the walls of the casing about the opening therein through which the plunger extends and passage 17 is preferably of such diameter that it will substantially align plunger 28 with the valve pin 29 of the valve in the valve stem.

Intermediate the length of lever 26 is provided a link 30, one end of which may be pivoted to lever 26 or otherwise held in engagement therewith and the other end of which is suitably secured to a flexible diaphragm 31 which is cemented or otherwise secured to the casing 15 to overlie and seal an opening 32 therein.

Ordinarily, lever 26 rests upon plunger 28 which in turn engages the valve pin 29 but insufficient pressure is exerted upon the plunger 28 to cause it to open the valve 29. However, when air is admitted under pressure to the interior of casing 15 from the tubular element 5, flexible diaphragm 31 is forced outwardly causing, through the medium of link 30 and lever 26, the plunger 28 to force the valve pin 29 downwardly and thus open the valve in the valve stem 23. When the supply of air under pressure to the pressure-responsive device 14 is cut off and atmospheric pressure exists therein, diaphragm 31 returns to its normal position thereby relieving the pressure upon plunger 28 and permitting the valve in the valve stem 23 to close.

It will be noted that the tubular element 5 will contain air under pressure only when the valve in the end of an air supply hose is pressed over the nipple 6 and, hence, when the supply hose is removed, air in tubular element 5 and the pressure-responsive device 14 will return to atmospheric pressure.

It will be noted that, by employing a device of the foregoing character, air may be supplied to a spare tire within a compartment of a motor vehicle without any necessity of unlocking or opening the cover thereof and, furthermore, air supply devices, commonly employed at filling stations, may be used and regulated to provide the desired pressure in the spare tire and the pressure therein created will conform to the indicated pressure to which said air supply device is regulated substantially as closely as though the air supply hose were connected to the valve stem of the spare tire itself. In other words, by employing a pressure-responsive device of the character contemplated for opening the valve in the valve stem of the spare tire, substantially the same conditions exist as in those cases where the valve of the air supply hose is pressed directly over the valve stem itself. Where no such valve operating means is provided, the foregoing result cannot be obtained because quite a pressure differential must exist between the air pressure in the tube 5 and the pressure in the spare tire in order to open the valve of the tire and force air therein.

It should also be noted that by employing means of the character described which will open the valve in the valve stem of the spare tire only when air is supplied thereto, no loss of air from the tire will occur through leaks or for other reasons attributable to defects in the tubular air-supply means and associated parts.

While I have described my invention in its preferred embodiment, it is to be understood that the words which I have used are words of description rather than of limitation. Hence, changes within the purview of the appended claim may be made without departing from the true scope and spirit of my invention in its broader aspects.

What I claim is:

In a device of the character described, a tubular element adapted to conduct air to a spare tire within a closed compartment of a vehicle body, said tubular element being provided at one end thereof with means for readily and removably attaching said element to the valve stem of said tire, and the other end of said tubular element being adapted to permit the valve in the end of an air supply hose to be pressed thereover, said last mentioned end of said tubular element being provided with means for opening said valve of the air supply hose when pressed thereover, and air pressure-responsive means operable wholly by air pressure within said tubular element for opening the valve in said tire, said pressure-responsive means comprising a movable diaphragm having one side only thereof subject to air pressure within said tubular element and a lever operable thereby and adapted to be disposed in operative relation to the valve pin in the valve stem of said tire when said tubular element is attached to said stem whereby when air under pressure is admitted to said tubular element said pressure-responsive means will operate to open the valve in said tire and when said air pressure is relieved the valve in said tire will close.

WILLIAM R. BREWSTER.